United States Patent [19]

Nakatsukasa et al.

[11] Patent Number: 5,175,656
[45] Date of Patent: Dec. 29, 1992

[54] DISK CARTRIDGE LOADINGS/UNLOADING SYSTEM

[75] Inventors: Naoyuki Nakatsukasa; Katsufusa Tanaka; Toshihiro Tanaka, all of Amagasaki, Japan

[73] Assignee: Mitsubishi Denki Kabushiki Kaisha, Tokyo, Japan

[21] Appl. No.: 609,573

[22] Filed: Nov. 6, 1990

[30] Foreign Application Priority Data

Nov. 7, 1989 [JP] Japan .................................. 1-290876
Jan. 24, 1990 [JP] Japan .................................. 2-15405
Oct. 1, 1990 [JP] Japan .................................. 2-260455

[51] Int. Cl.⁵ .............................................. G11B 17/04
[52] U.S. Cl. .................. 360/98.04; 360/96.6; 360/99.08
[58] Field of Search ............ 360/98.04, 96.5, 93, 360/96.6, 99.08

[56] References Cited

U.S. PATENT DOCUMENTS 4,479,210 10/1984 Nakayama ................ 360/98.4 X
4,811,138 3/1989 Park .......................... 360/96.5
4,912,579 3/1990 Kinoshita et al. ............ 360/96.5

FOREIGN PATENT DOCUMENTS 63-91862 of 1988 Japan .

Primary Examiner—John H. Wolff
Attorney, Agent, or Firm—Leydig, Voit & Mayer

[57] ABSTRACT

A disk cartridge loading/unloading system which loads or unloads disk cartridges into or from a container in which the disk cartridges are housed. The disk cartridge includes a cartridge holder, an open/close cover, and a drawing member. The cartridge holder is capable of rotating between a store position of the disk cartridge in the container and an unloading position for unloading the disk cartridge, and is also capable of retaining the disk cartridge. The open/close cover, rotatably attached to the front end of the cartridge holder, closes an opening for a disk entrance when the disk cartridge is in the store position. The drawing member is provided in such a manner that one end of the drawing member is pivotally connected to the open/close cover, and the other end of the drawing member has a stop click for drawing the cartridge. As the open/close cover is rotated, the drawing member is caused to shift toward the front end of the cartridge holder.

4 Claims, 10 Drawing Sheets

DISK CARTRIDGE LOADINGS/UNLOADING SYSTEM

BACKGROUND OF THE INVENTION

1. Field of the Invention

The present invention relates to a disk cartridge loading/unloading system which loads or unloads disk cartridges into or from a container in which the disk cartridges are housed.

2. Description of the Related Art

FIGS. 11 and 12 are cross-sectional views respectively showing a conventional disk container and a disk cartridge loading/unloading system disclosed, for example, in Japanese Unexamined Patent Publication No. 63-91862. In FIG. 11, racks 4 in a plurality of stages are vertically arranged parallel to each other in a box-shaped housing 2 of the container, whose entirety is designated by reference character 1. The racks 4 are for storing a number of disk cartridges 3 (hereinafter referred to simply as cartridges) in which disks are contained. Regeneration units 5 are arranged directly under the racks 4, which units are for recording information onto the disk inside the cartridge 3, and for reading information written on the disk. Furthermore, a conveying system 6 is vertically arranged inside the housing 2, which system is for unloading a desired cartridge 3 from the rack 4 before inserting the cartridge 3 into the regeneration unit 5, and for reversely unloading the cartridge 3 from the regeneration unit 5 before returning the cartridge 3 to a predetermined rack 4. An opening 2b for loading the cartridge 3 into the container 1, and for unloading it from the container 1, is formed in an upper face panel 2a of the housing 2, and is arranged directly over the racks 4. The disk cartridge loading/unloading system 7 is provided in the opening 2b.

The conventional disk cartridge loading/unloading system 7 will be described hereinafter with reference to FIG. 12. In FIG. 12, reference character 10 denotes an open/close cover for covering the opening 2b which is formed in the upper face panel 2a of the housing 2, and the open/close is for loading and unloading the disk-contained cartridge 3. A handle 10a is formed at the front end of the open/close cover 10. The open/close cover 10 is pivotally supported at 0 at the upper part of the container 1. The open/close cover 10 performs an open and close operation by rotating between an angle position (close position) in which the surface of the cover 10 becomes horizontal so as to close the opening 2b, and an angle position (open position) in which the cover 10 is rotated upward from the close position by an angle of $\theta$ so as to open the opening 2b. The open/close cover 10 rotates on the pivotal point 0. FIG. 12 shows the open/close cover 10 when it is in the open position. A cartridge holder 11 is arranged under the open/close cover 10. The base 11a of the cartridge holder 11 is secured to the open/close cover 10. The cartridge holder 11 and the open/close cover 10 are constructed so as to integrally rotate on the rotation center 0. Due to the above, when the open/close cover 10 opens or closes, the cartridge holder 11 is interlocked by the cover to rotate around the base 11a of the cartridge holder 11. An insertion opening 11b is formed at the front end 11c of the cartridge holder 11 in order to insert the cartridge 3. A hollow 11d, into which most of the cartridge 3 is inserted, is also formed at the back of the insertion opening 11b. The cartridge holder 11 retains the cartridge 3, inserted from the insertion opening 11b, in the hollow 11d.

FIG. 13 illustrates the outward appearance of the cartridge 3. A disk 12, such as an optical disk or a magnetic disk, which is a recording medium, is housed in the cartridge 3. A pair of concavities 3a are formed on the sides of the cartridge 3, which concavities are for hooking a conveying hook (not shown) which clamps the cartridge 3 of the conveying system 6. Furthermore, a shutter 3b is provided on one face of the cartridge 3, which shutter opens when information is recorded onto the disk 12, or when information is read from the disk 12.

The operation of the conventional disk cartridge loading/unloading system will now be described. First, the handle 10a on the front end of the open/close cover 10 is pulled upward so as to rotate the open/close cover 10 around the pivotal point 0 in the base of the cover to the open position (position indicated by solid lines in FIG. 12). Under the above conditions, the cartridge 3 is inserted from the insertion opening 11a of the cartridge holder 11, and then the open/close cover 10 is rotated to the close position (position indicated by dot-and-dash lines in FIG. 12). At this time, the cartridge holder 11 is interlocked by the open/close cover 10 so as to rotate to the angle position in which the base 11a and the front end 11c of the cartridge holder 11 become substantially horizontal. This completes the insertion operation of the cartridge 3, retained in the cartridge holder 11, into the container 1.

After the cartridge 3 is thus inserted, the conveying hook (not shown) of the conveying system 6 is hooked in the concavities 3a, formed on the sides of the cartridge 3, thereby drawing the cartridge 3 from the cartridge holder 11 in order to convey it to the regeneration unit 5 or the rack 4.

In addition, in order to unload the cartridge 3 from the container 1, an operation which is the reverse of the above description is performed.

Since the conventional disk cartridge loading/unloading system is constructed as described above, the projected portion of the cartridge 3 from the front end 11c of the cartridge holder 11 is small, when the cartridge 3 is unloaded from the cartridge holder 11. Because the open/close cover 10 is arranged directly over the insertion opening 11b of the cartridge holder 11, the open/close cover 10 hinders the unloading of the cartridge 3. The above reasons have resulted in a problem in that it is difficult to unload the cartridge 3 from the cartridge holder 11.

SUMMARY OF THE INVENTION

The present invention has been accomplished in order to overcome the foregoing problem. The object of a first invention is to provide a disk cartridge loading/unloading system which facilitates the unloading of cartridges from the cartridge holder. In addition to the object of the first invention mentioned above, the object of a second invention is to provide a disk cartridge loading/unloading system which can prevent the cartridge from being accidentally ejected from the cartridge holder when the cartridge holder retains the cartridge.

In addition to the objects of the first and second inventions, the object of a third invention is to provide a disk cartridge loading/unloading system in which a simply constructed and easily assembled system which prevents the cartridge from coming out is provided in the cartridge holder. In accordance with one aspect of the invention, a disc cartridge loading/unloading system is mounted to a container that houses a plurality of disc cartridges and has an opening for accepting the disc cartridges, the disc cartridge loading/unloading system comprising a cartridge holder, an open/close cover, and a drawing member. The cartridge holder is rotatably supported by the container to rotate between a store position, for retaining a disc cartridge, and an unloading position, for unloading a disc cartridge. The open/close cover is rotatably attached to a first end of the cartridge holder and closes the container opening when the cartridge holder is in the store position. The drawing member has one end which is pivotally connected to the open/close cover and a second end which has a stop. The open/close cover urges the drawing member toward the first end of the cartridge holder when the open/close cover is rotated.

In accordance with a second aspect of the invention, a disc cartridge loading/unloading system comprises a lock member and a lock release member in addition to the cartridge holder, the open/close cover, and the drawing member. The lock member is provided in the cartridge holder and prevents the drawing member from shifting toward the first end of the cartridge holder. The lock release member releases the lock member from the drawing member when the cartridge holder is rotated by a predetermined angle from the store position of the cartridge holder.

In accordance with a third aspect of the invention, a disc cartridge loading/unloading system comprises stop members in addition to the cartridge holder, the open/close cover, and the drawing member. The stop members are provided in the cartridge holder and are engaged with the disc cartridge so as to prevent the disc cartridge from coming out of the disc cartridge holder when the disc cartridge is retained in a predetermined position of the cartridge holder.

In the disk cartridge loading/unloading system according to the first aspect, when the open/close cover is rotated, part of the disk cartridge is ejected, with the aid of the drawing member, from the cartridge holder. Under the above conditions, it is thus easy to unload the disk cartridge by grasping the projected part of the disk cartridge.

Further, in a disc cartridge loading/unloading system according to the second aspect, when the cartridge holder is in the unloading position after it has been rotated by the predetermined angle from the store position, the lock release member releases the lock of the lock member. When the cartridge holder is in a rotation position which is under the predetermined angle, the lock member locks the drawing member. When the disk cartridge is in a position other than the unloading position, it is possible to prevent the disk cartridge from being accidentally ejected by the drawing member.

Moreover, in a disc cartridge loading/unloading system according to the third aspect, when the disk cartridge is retained in the predetermined position of the cartridge holder, the stop members arranged in the cartridge holder are engaged with the disk cartridge so as to prevent without fail the disk cartridge from coming out of the disk cartridge holder.

DESCRIPTION OF THE PREFERRED EMBODIMENTS

Figure 1:
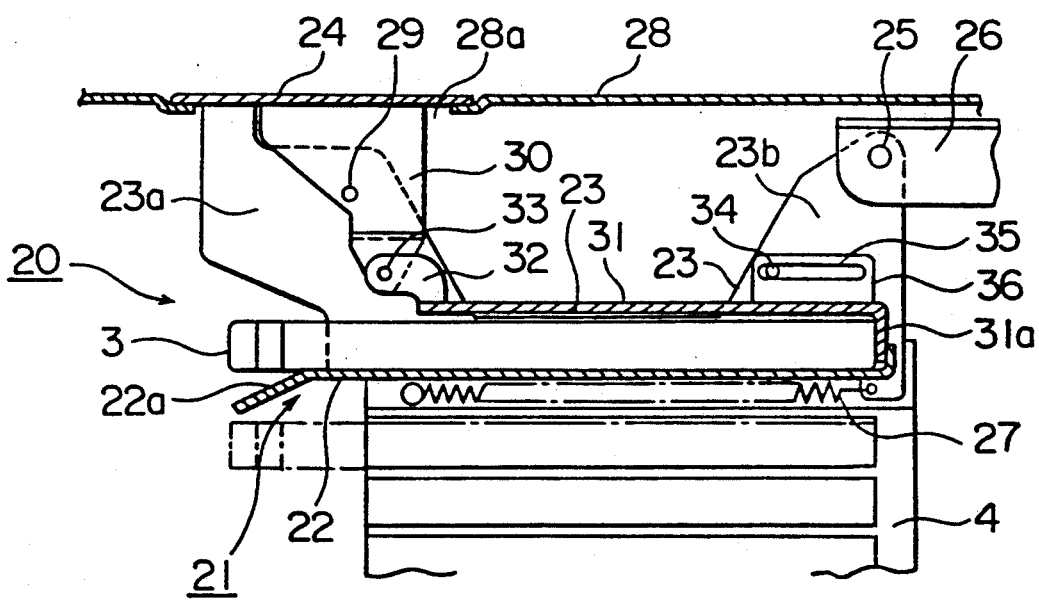
FIG. 1 is a side cross-sectional view showing an embodiment of a disk cartridge loading/unloading system according to the present invention.
Figure 2:
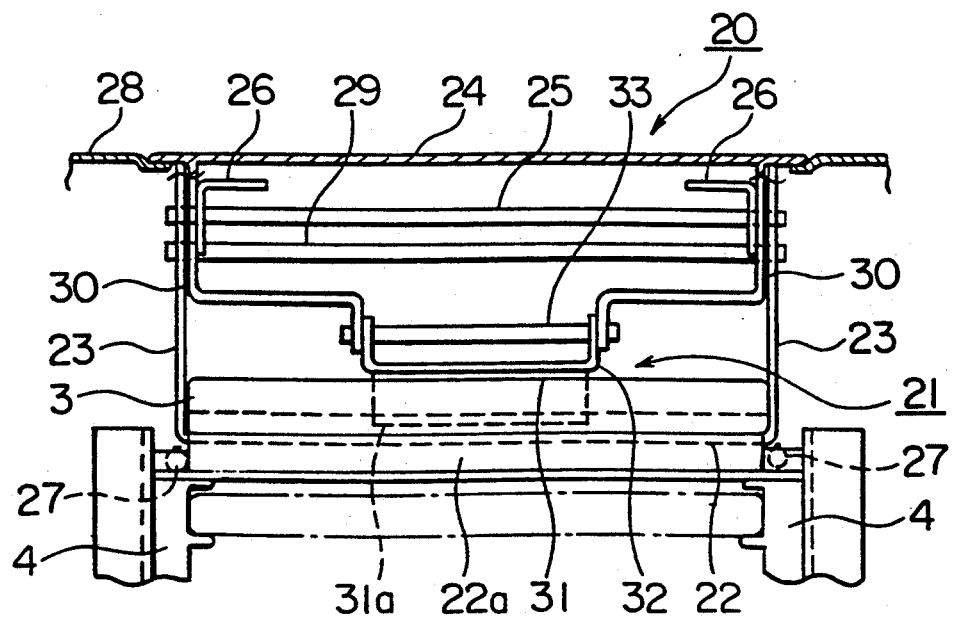
FIG. 2 is a front view of the disk cartridge loading/unloading system in FIG. 1.
Figure 3:
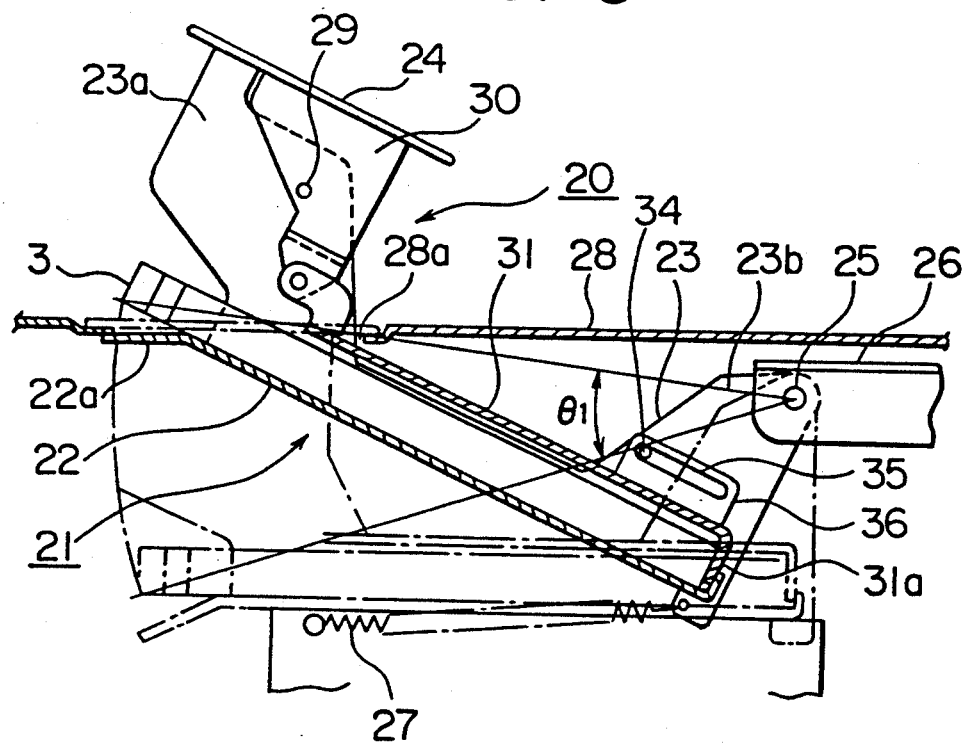
FIG. 3 is a side cross-sectional view explaining an operation of unloading cartridges from the disk cartridge loading/unloading system.
Figure 13:
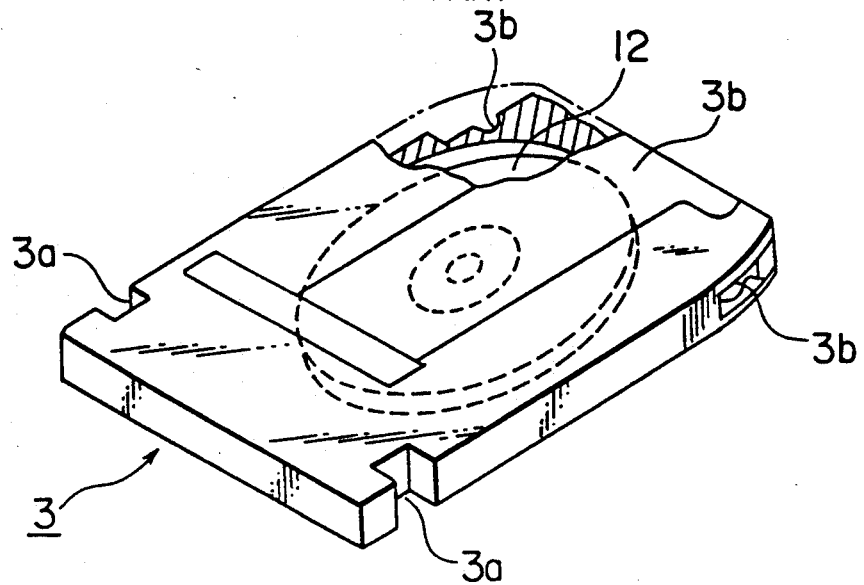
FIG. 13 is a perspective view illustrating a cartridge.

The embodiments of the present invention will be described hereinafter with reference to the drawings. FIGS. 1 through 4 show a disk cartridge loading/unloading system 20 according to a first embodiment of the invention. In FIGS. 1 through 3, reference character 21 denotes a cartridge holder into which a disk cartridge (hereinafter referred to simply as a cartridge) 3 as shown in FIG. 13 is inserted, and which retains the cartridge 3 inside the cartridge holder. The cartridge holder 21 is made up of a bottom plate 22 which supports most of the cartridge 3, and of two side plates 23 which are arranged on the right and left sides so that the widths of the plates become substantially equal to that of the cartridge 3. An insertion opening 22a, whose edge is bent, is provided in the bottom plate 22 in order to facilitate the insertion of the cartridge 3. A cover plate 23a for supporting an open/close cover 24, which will be described later, is provided in the front end (on the side of the insertion opening 22a) of the side plates 23. A holder rotation lever 23b is provided at the back of the side plates 23. The holder rotation lever 23b is rotatably fixed, with the aid of a pivot 25, to a support member 26 which is arranged in an appropriate position of the upper part of the container. The cartridge holder 21 performs a first open and close operation by rotating between an angle position (first close position) in which the bottom plate 22 of the cartridge holder 21 becomes horizontal, and an angle position (first open position) in which the cartridge holder 21 is rotated upward from the first close position by an angle of $\theta_1$. The cartridge holder 21 rotates on the pivot 25. A tension spring 27 is provided between the back end of the cartridge holder 21 and a rack 4 in which the cartridge 3 is housed. The tractive force of the tension spring 27 is provided so as to rotate the cartridge holder 21 on the pivot 25 in a clockwise direction in FIG. 1; that is, to rotate the cartridge holder 21 from the first close position to the first open position. FIG. 3 shows the cartridge holder 21 when it is in the first open position.

Reference character 24 designates an open/close cover which is for loading and unloading the cartridge 3, and which is provided in an upper face panel 28 of the container in order to cover an opening 28a. The open/close cover 24 is supported by one end of a cover rotation plate 30. The other end of the cover rotation plate 30 is pivotally supported at 29 by the cover plate 23a, which is provided in the side plates 23 of the cartridge holder 21. By this arrangement, as the cartridge holder 21 is rotated on the pivot 25, the open/close cover 24 moves, whereby the opening 28a of the upper face 28 of the container opens and closes.

Since the rotation center of the cartridge holder 21, that is, the pivot 25, is arranged above the cartridge holder 21, as shown in FIG. 3, when the cartridge 3 is inserted under the conditions where the cartridge holder 21 is in the close position, it is sufficient to protrude only the insertion opening 22a from the upper face panel 28. The opening 28a provided on the upper face panel 28 is thus made small. A holder upper face plate 31 is provided in the upper part of the cartridge holder 21. A space is formed between the holder upper face plate 31 and the bottom plate 22 of the cartridge holder 21. The size of the space is slightly larger than the thickness of the cartridge 3. The inner part (backward) end of the holder upper face plate 31 is bent downward at substantially right angles, and forms a stop click 31a for drawing the cartridge. The cartridge 3 inserted from the insertion opening 22a of the cartridge holder 21 is retained by the cartridge holder 21 and the holder upper face plate 31. A drawing lever 32 is attached to the front of the holder upper plate 31, and is pivotally supported at 33 by the cover rotation plate 30. A drawing member is composed of the holder upper face plate 31 and the drawing lever 32.

Figure 4:
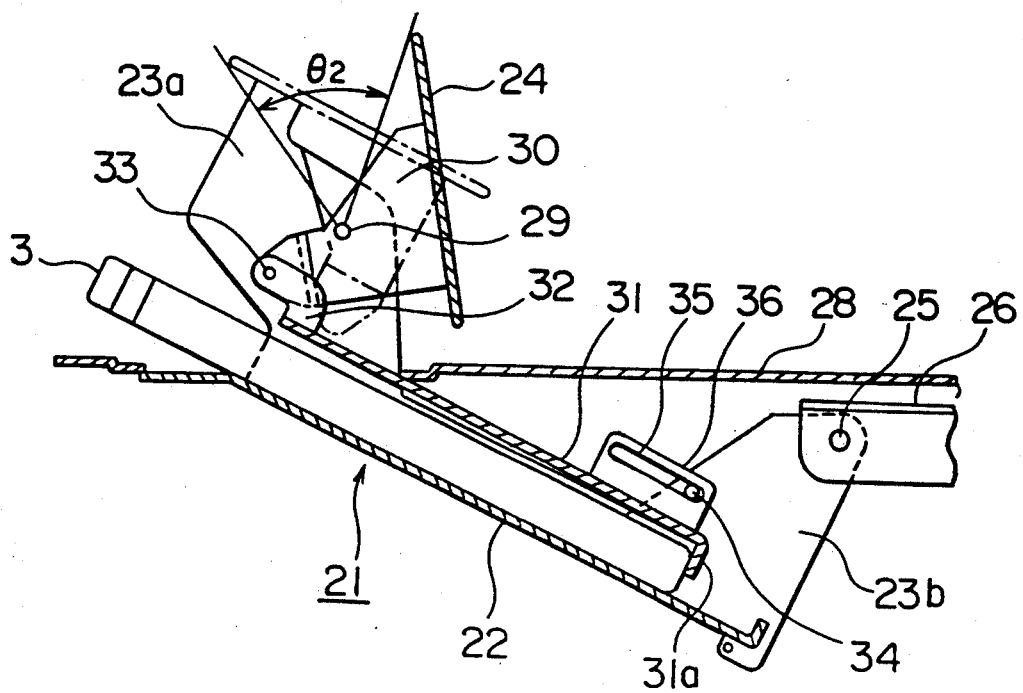
FIG. 4 is a side cross-sectional view explaining an operation of drawing cartridges from a cartridge holder.
Figure 5:
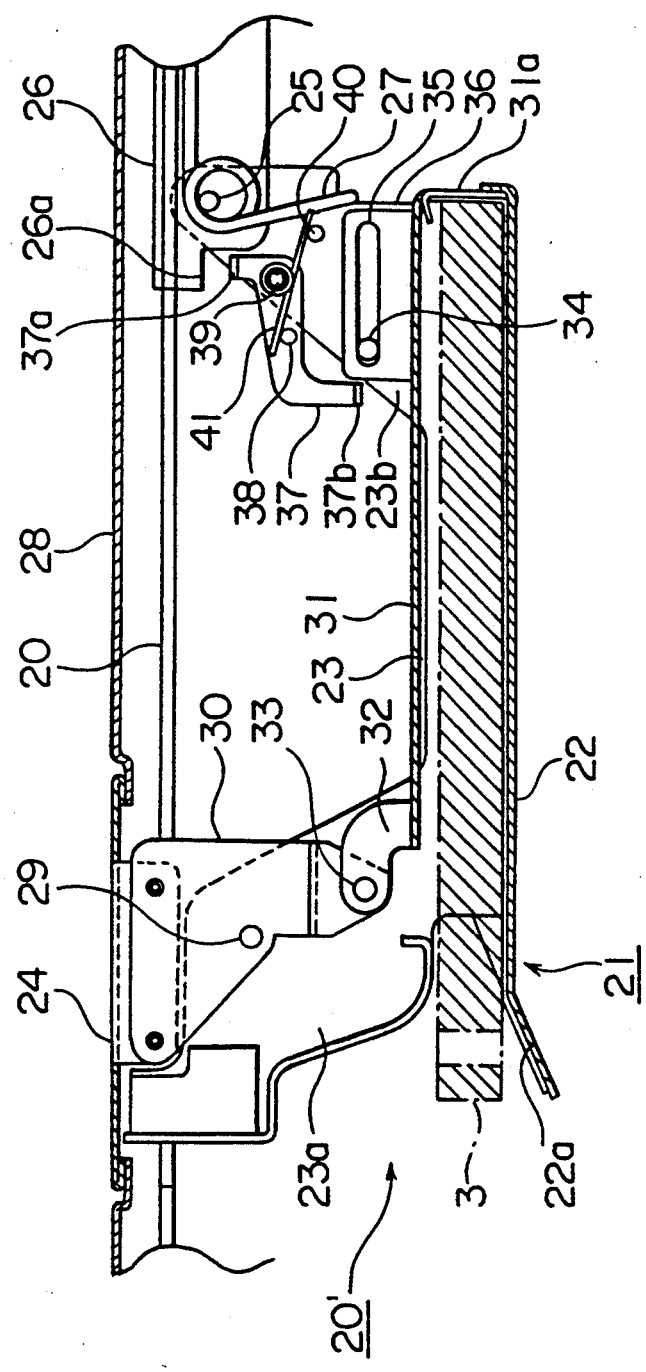
FIG. 5 is a side cross-sectional view showing a second embodiment of a disk cartridge loading/unloading system according to the invention.

As illustrated in FIG. 4, the open/close cover 24 performs a second open and close operation by rotating between an angle position (second close position indicated by a dot-and-dash line in FIG. 4) in which the open/close cover 24 is supported by the cover plate 23a, the cover 24 being rotated on the pivotal point 29, and an angle position (second open position indicated by a solid line in FIG. 4) in which the open/close cover 24 is rotated upward from the second close position by an angle of $\theta_2$. Due to the rotation of the open/close cover 24, the drawing lever 32 provided on the holder upper face plate 31 is drawn forward with the aid of the cover rotation plate 30, whereby the holder upper face plate 31 advances toward the insertion opening 22a. Thus, when the open/close cover 24 is rotated on the pivotal point 29 by means of the second open operation to the second open position, after the cartridge holder 21 is rotated on the pivot 25 by means of the first open operation, the cartridge 3 retained inside the cartridge holder 21 is partially drawn from the insertion opening 22a to a predetermined length, because of the stop click 31a which is formed on the back end of the holder upper face plate 31. A guide plate 36 having a guide groove 35 is provided at the back of the holder upper face plate 31. A pin 34 arranged in the holder rotation lever 23b is engaged with the guide groove 35, which extends substantially parallel to the bottom plate 22 of the cartridge holder 21. The engagement of the pin 34 with the guide groove 35 permits the holder upper face plate 31 to move back and forth.

Figure 11:
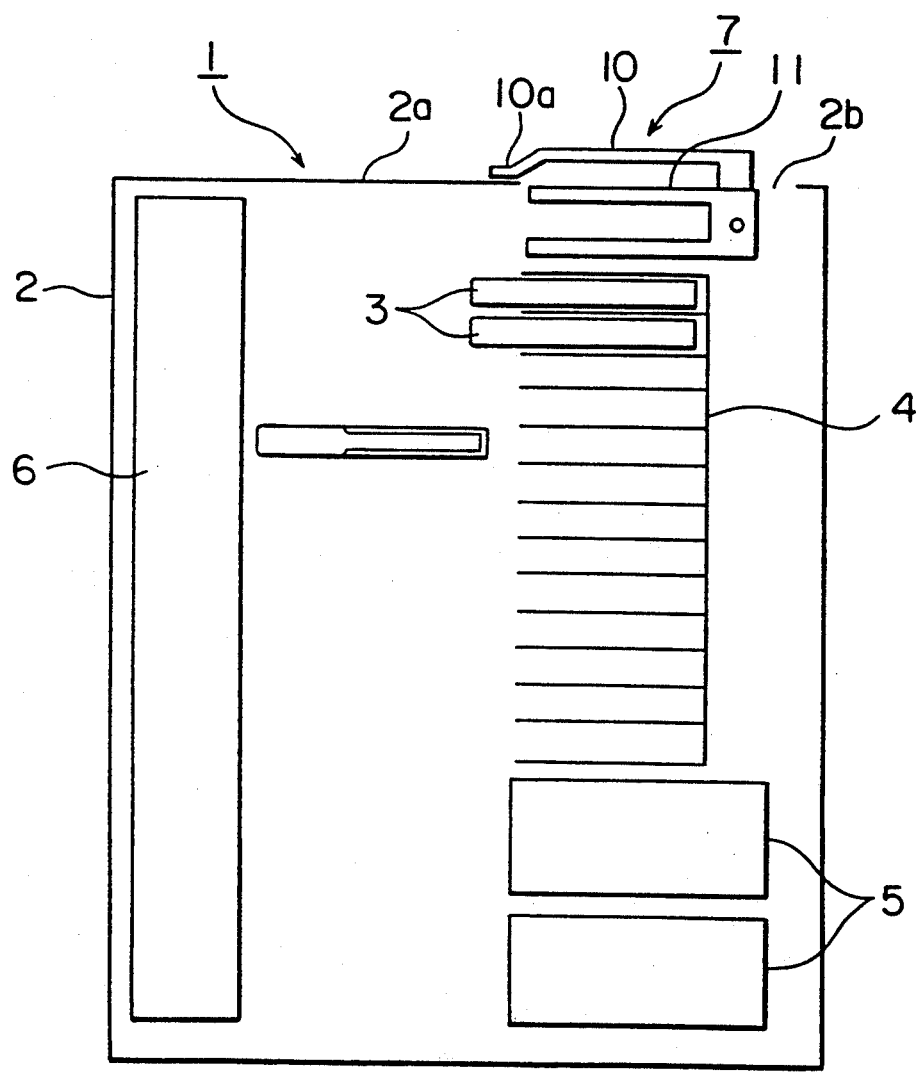
FIG. 11 is a schematic side cross-sectional view showing the inside of a conventional container.
Figure 12:
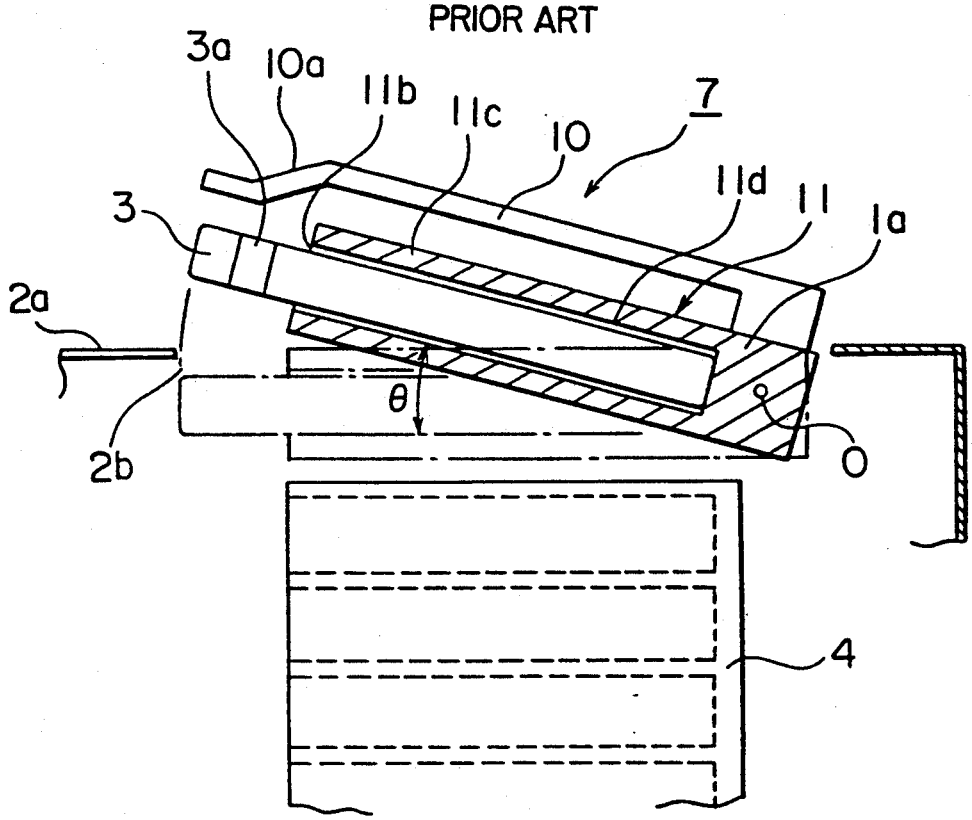
FIG. 12 is a side cross-sectional view showing a conventional disk cartridge loading/unloading system.

In the above arrangement, once a command to unload the cartridge 3 from the container is transmitted to a conveying system as shown in FIG. 11, the cartridge 3 is unloaded from a regeneration unit or a rack by the conveying system as illustrated in FIG. 11, and is conveyed to the disk cartridge loading/unloading system 20, following which it is inserted into the cartridge holder 21. When it is confirmed that the cartridge 3 is inserted into the cartridge holder 21, a latch (not shown) retaining the cartridge holder 21 in the first close position is unlatched. As shown in FIG. 3, the cartridge holder 21 is then rotated on the pivot 25 in a clockwise direction of FIG. 3. When the cartridge holder 21 is rotated to the first open position indicated by solid lines in FIG. 3, part of the cartridge holder 21 appears from the opening 28a which is formed in the upper face panel 28. Under the above conditions, it is difficult to unload the cartridge 3, because most of the cartridge 3 is within the cartridge holder 21.

Next, as shown in FIG. 4, when the open/close cover 24 is rotated by hand to the second open position, the drawing lever 32 arranged above the holder upper face plate 31 is pulled forward by the cover rotation plate 30 attached to the open/close cover 24. The holder upper face plate 31 is then drawn from the insertion opening 22a of the cartridge holder 21 a predetermined length. At the same time, part of the cartridge 3 retained inside the cartridge holder 21 is drawn from the cartridge holder 21 by means of the stop click 31a which is provided at the back of the holder upper face plate 31. Under the above conditions, it is easy to unload the cartridge 3 from the cartridge holder 21, since the upper and lower surfaces of the cartridge 3 can be easily grasped by hand, without being hindered not only by the cover plate 23a, but also by the open/close cover 24.

Figure 6:
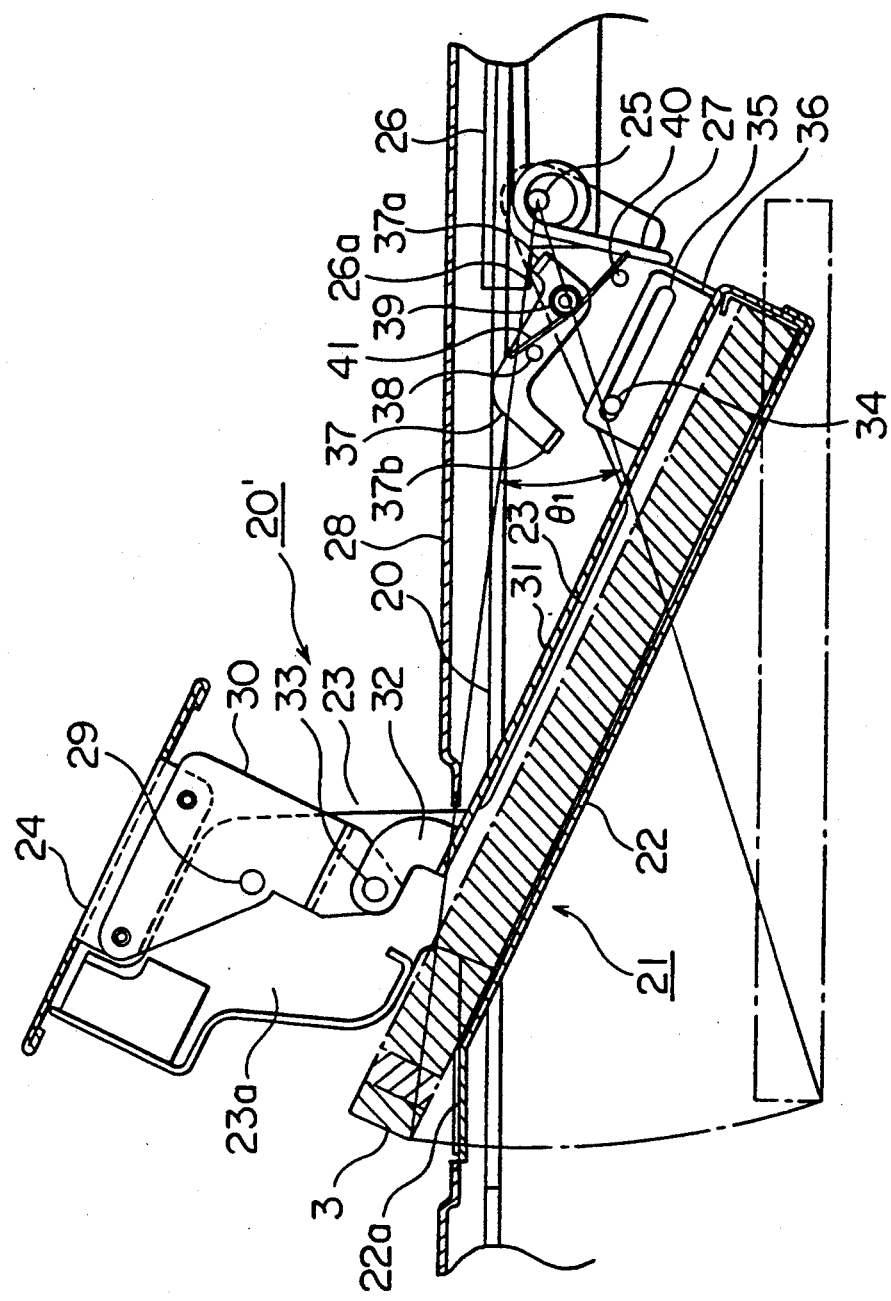
FIGS. 6 and 7 are side cross-sectional views explaining an operation of unloading cartridges from the cartridge holder of FIG. 5.
Figure 7:
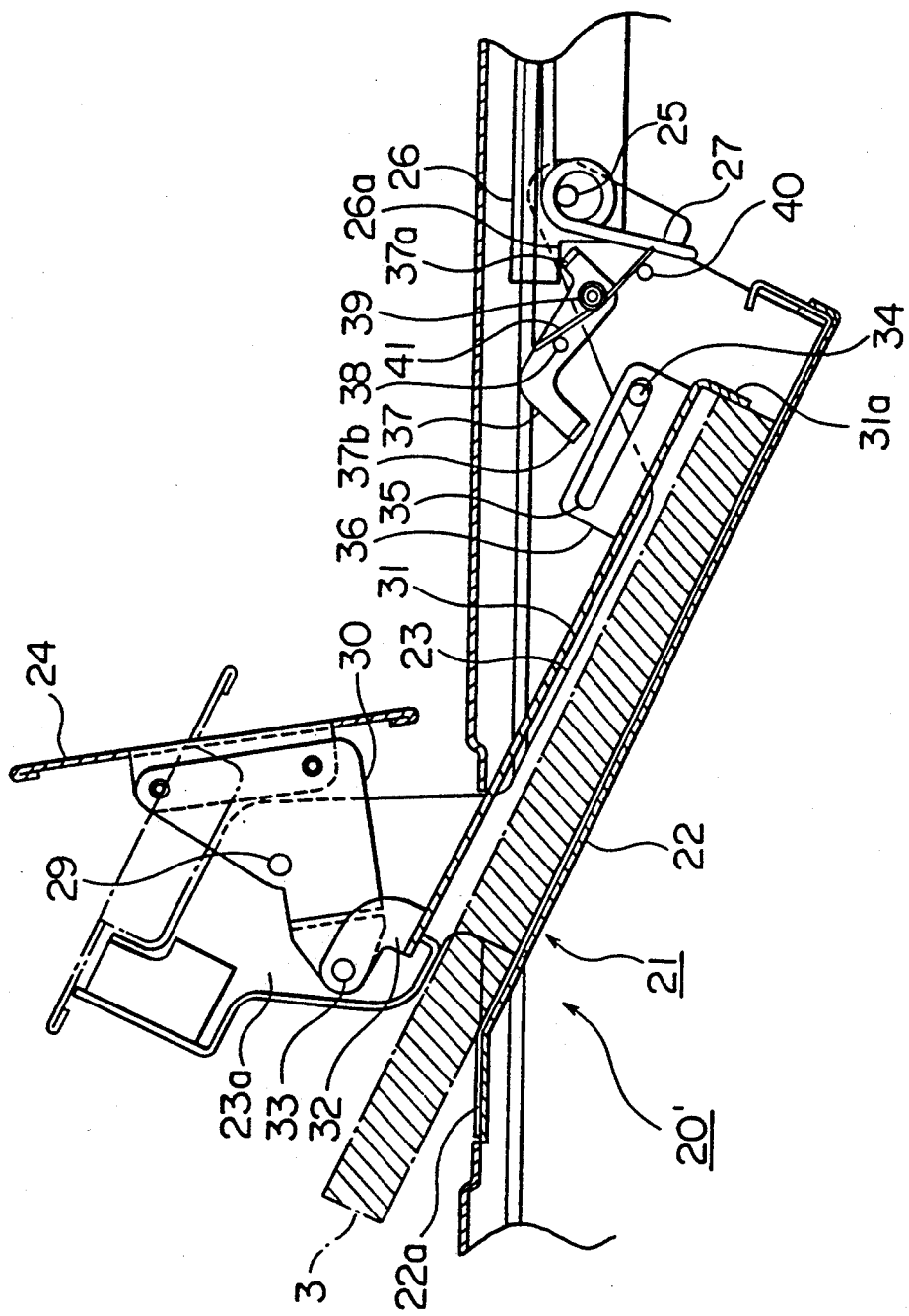

FIGS. 5 through 8 are side cross-sectional views showing a disk cartridge loading/unloading system 20' in accordance with another embodiment. In these drawings, reference character 37 indicates a lock lever, used as a lock member, which is rotatably attached to a pin 39 secured to the holder rotation lever 23b. The pin 39 has a torsion spring 41 wound around it. One end of the torsion spring 41 contacts the pin 39 which is disposed in the lock lever 37. The other end of the torsion spring 41 contacts a pin 40 which is arranged in the holder rotation lever 23b. The lock lever 37 is energized by the torsion spring 41 so as to rotate counterclockwise in FIG. 5. One end of the Z-shaped lock lever 37 is bent downward at substantially right angles, and forms a stop click 37b. The stop click 37b of the lock lever 37 rests on the front end of the guide plate 36 which protrudes upward from the back end of the holder upper face plate 31, thereby preventing the holder upper face plate 31 from moving leftward in FIG. 5. However, as shown in FIG. 6, when the cartridge holder 21 is rotated from the first closed position indicated by dot-and-dash lines to the first open position indicated by solid lines, the lock lever 37 together with the cartridge holder 21 rotates. When the rotation angle of the cartridge holder 21 exceeds a predetermined value, the contact portion 37a of the lock lever comes in contact with the cut-away portion 26a of a support member 26 which serves as a lock release member. Under the above conditions, when the cartridge holder 21 is further rotated, the lock lever 37 is rotated on the pin 39 by means of the contact of the contact portion 37a with the cut-away portion 26a. For the cartridge holder 21, the lock lever 37 is rotated clockwise in FIG. 6. When the cartridge holder 21 is then rotated by a predetermined angle, as illustrated in FIG. 6, the lock lever 37 is disengaged from the guide plate 36 of the holder upper face plate 31, and the holder upper face plate 31 becomes capable of moving relative to the cartridge holder 21. Thus, the open/close cover 24 can perform the second open and close operation by rotating on the pivotal point 29 between an angle position (second close position) in which the cover 24 is supported by the cover plate 23a, and an angle position (second open position) in which the cover 24 is rotated clockwise by a predetermined angle $\theta_2$ from the second closed position. Through rotating the open/close cover 24 from the second closed position to the second open position, the holder upper face plate 31 also advances by virtue of the fact that the drawing lever 32 above the holder upper face plate 31 is drawn toward the insertion opening 22a. Thus, when the open/close cover 24 is rotated by means of the second open operation to the second open position, after the cartridge holder 21 is rotated by means of the first open operation, the lock lever 37 comes off, which lever prevents the guide plate 36 of the holder upper face plate 31 from moving. The cartridge 3 retained inside the cartridge holder 21 is partially drawn from the insertion opening 22a because of the stop click 31a which is formed on the back of the holder upper face plate 31. FIG. 7 shows the state where the open/close cover 24 is rotated to the second open position, and part of the cartridge 3 is drawn from the insertion opening 22a.

Figure 8:
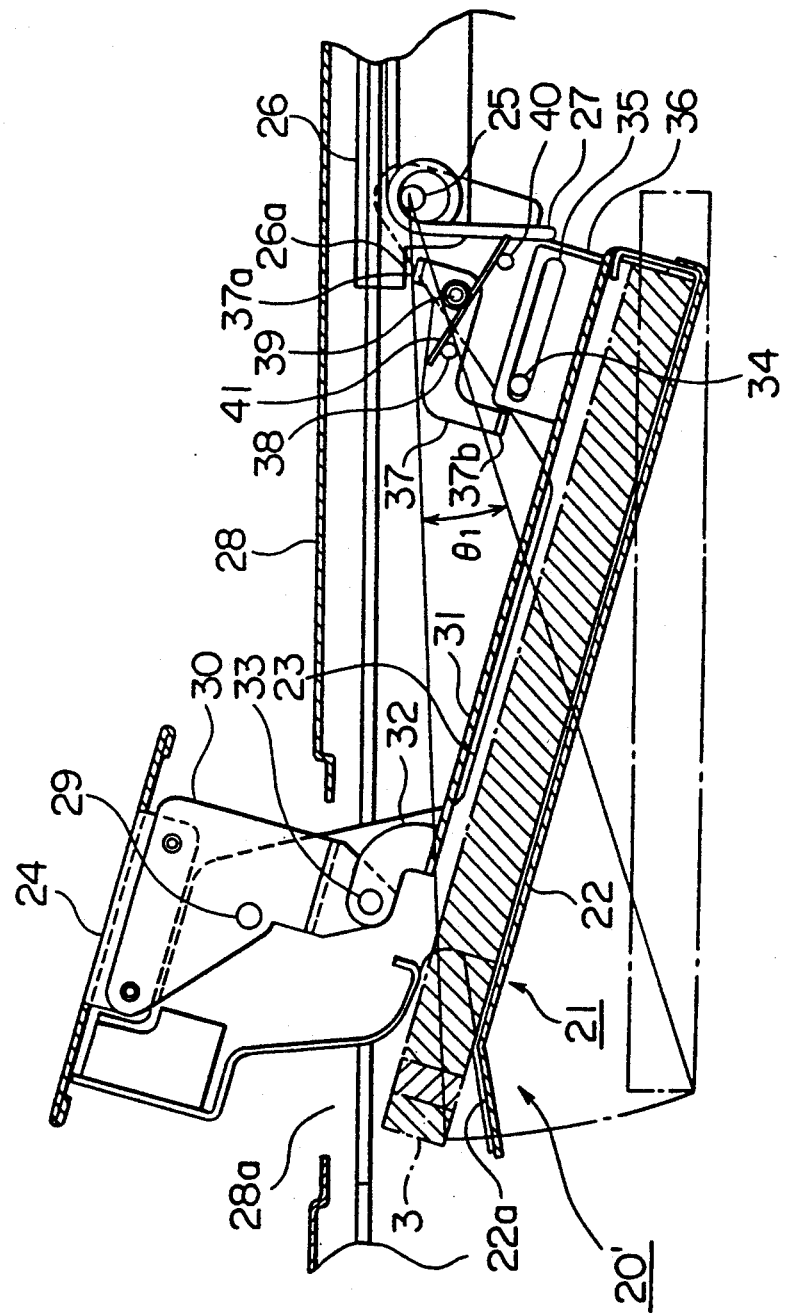
FIG. 8 is a side cross-sectional view explaining an operation of inserting cartridges into a container.

The operation of inserting the cartridge 3 into the container will now be described with reference to FIG. 8. When the cartridge holder 21 is rotated until the cartridge 3, retained on the cartridge holder 21, comes under the opening 28a of the upper face panel 28, the contact portion 37a of the lock lever 37 becomes disengaged from the cutaway portion 26a of the support member 26. As a result, the lock lever 37 is rotated counterclockwise in FIG. 8 by means of the torsion spring 41, whereby the stop click 37b rests on the guide plate 36 of the holder upper face plate 31, thereby preventing the lock lever 37 from moving.

A description will now be given of an example where the cartridge 3 is unloaded in the disk cartridge loading-/unloading system 20'. Once a command to unload the cartridge 3 from the container is transmitted to a conveying system (not shown) inside the container, the cartridge 3 is conveyed by the conveying system from an unillustrated rack or a regeneration unit to the disk cartridge loading/unloading system 20', and is inserted into the cartridge holder 21. When it is confirmed that the cartridge 3 is inserted into the cartridge holder 21, a latch (not shown) retaining the cartridge holder 21 in the first close position is unlatched. The cartridge holder 21 is then rotated on the pivot 25, the holder 21 being rotated from the first closed position by means of the tractive force acting on the tension spring 27. When the cartridge holder 21 is rotated to the first open position, part of the cartridge holder 21 appears in the insertion opening 22a of the opening 28a which is arranged on the upper face panel 28. Under the above conditions, it is difficult to unload the cartridge 3. Next, when the open/close cover 24 is rotated by hand from the second closed position to the second open position, the drawing lever 32 arranged above the holder upper face plate 31 is pulled by the cover rotation plate 30 attached to the open/close cover 24. The holder upper face plate 31 is then drawn toward the insertion opening 22 of the cartridge holder 21. At the same time, part of the cartridge 3 retained inside the cartridge holder 21 is drawn from the cartridge holder 21 by means of the stop click 31a which is provided at the back of the holder upper face plate 31. Under the above conditions, it is easy to unload the cartridge 3 from the cartridge holder 21, since the upper and lower surfaces of the cartridge 3 can be easily grasped by hand.

When the cartridge 3 is inserted into the container, an operation which is the reverse of the above description may be performed. When the cartridge holder 21 is rotated from the first open position to the first closed position, even if one tries to rotate the open/close cover 24 from the second closed position to the second open position, while the cartridge 3 is positioned under the opening 28a of the upper face panel 28, the open/close cover 24 will not be rotated, since the stop click 37b of the lock lever 37 prevents the guide plate 36 of the holder upper face plate 31 from moving. Consequently, the cartridge 3 will not be ejected under the upper face panel 28.

Figure 9:
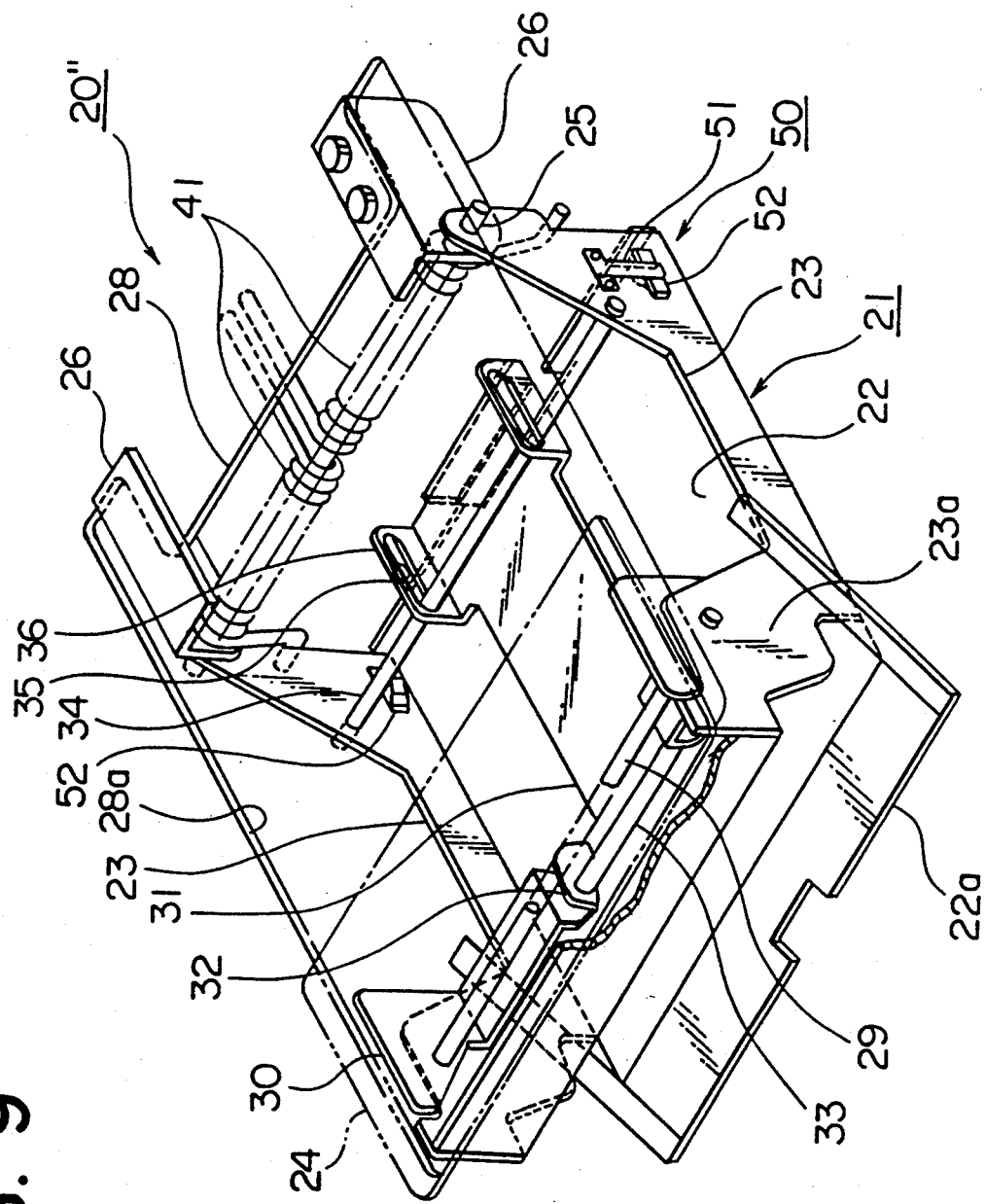
FIG. 9 is a perspective view illustrating a third embodiment of a disk cartridge loading/unloading system according to the invention.
Figure 10:
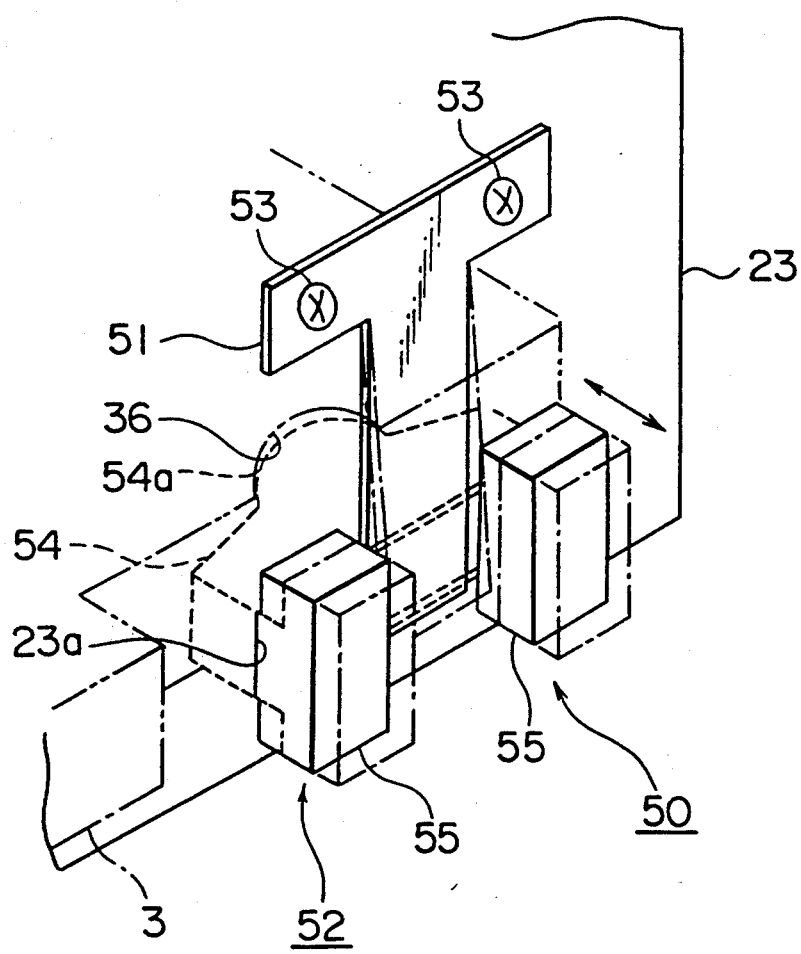
FIG. 10 is an enlarged perspective view in which the main parts of FIG. 9 are enlarged.

FIGS. 9 and 10 show a disk cartridge loading/unloading system 20'' according to a further embodiment of the present invention. In this embodiment, while the cartridge 3 is retained in a predetermined position of the cartridge holder 21, a pair of stop members 50, which are engaged with the cartridge 3 to prevent it from coming out, are provided on both sides of the cartridge holder 21. As illustrated in detail and enlarged in FIG. 10, each stop member 50 is composed of a T-shaped plate spring 51, whose base is secured by means of screws 53 or the like to one side of the cartridge holder 21, and an arresting piece 52 which is slidably attached to a guide hole 23a arranged in the side plate 23 of the cartridge holder 21 so as to move back and forth. The arresting piece 52 has a body 54 on the internal side thereof, in which an arc-like convexity 54a to be engaged with an arc-like concavity 3b formed on the side of the cartridge 3, and a pair of stopper pieces 55 on the external side thereof which are apart from each other, and which prevent the body 54 from coming off into the cartridge holder 21. The body 54 is slidably attached to the guide hole 23a arranged in the side plate 23 of the cartridge holder 21, and has substantially the same width and thickness as the guide hole 23a. The respective widths of the stopper pieces 55 are both larger than that of the guide hole 23a. The external side of the body 54 contacts the edge of the plate spring 51 between the pair of stopper pieces 55, and is elastically energized inward by means of the plate spring 51. Thus, when the cartridge 3 is not inserted into the cartridge holder 21, the arresting piece 52 is pressed inward by the plate spring 51 until the stopper pieces 55 come into contact with the peripheries of the side plates 23 of the cartridge holder 21. When the cartridge 3 is inserted into the cartridge holder 21 and then further inserted into the predetermined position, the arc-like convexity 54a inside the body 54 of the arresting piece 52 becomes engaged, by the energy acting on the plate spring 51, with the concavity 3b formed on the side of the cartridge 3. The cartridge 3 is thus retained in the predetermined position, and is prevented from being ejected.

As described above, in this embodiment, the stop members 50 are made up of the plate springs 51 and the arresting pieces 52. The structure of the stop members is extremely simple. It is also simple to assemble the disk cartridge loading/unloading system, because few parts are required, which fact contributes to reducing manufacturing costs.

As has been described above, according to the first invention, the disk cartridge loading/unloading system is constructed in such a manner that the drawing member provided has one end pivotally connected to the open/close cover, and the other end thereof has the stop click for drawing the cartridge. As the cover is rotated, the drawing member is caused to shift toward the front end of the cartridge holder. Consequently, when the cartridge is unloaded from the container, the rotation of the open/close cover with respect to the cartridge holder allows part of the cartridge to be ejected from the cartridge holder. Since it is thus extremely easy to unload the cartridge without being hindered by the open/close cover, the replacement of cartridges is rendered simple, whereby the operation of the disk cartridge loading/unloading system is improved.

Furthermore, according to the second invention, since a lock system is provided, which system prevents the drawing member from moving with respect to the cartridge holder, it is possible to prevent without fail the cartridge from being accidentally ejected by the drawing member, when the cartridge holder is in the store position and the predetermined rotation position.

Moreover, according to the third invention, because the stop members are arranged in the cartridge holder, which members are engaged with the cartridge holder when the cartridge is retained in the predetermined position of the cartridge holder, the cartridge can be kept in place without fail by means of the stop members so long as the cartridge is first inserted into the predetermined position of the cartridge holder. It is thus possible to prevent the cartridge from coming out or being ejected during the rotation of the cartridge holder, or due to vibrations in the store position. In addition, when the stop member is composed of a plate spring and an arresting piece, the structure of the stop member becomes extremely simple. It is also simple to assemble the disk cartridge loading/unloading system, because few parts are required, which fact contributes to reducing manufacturing costs.

What is claimed is:

1. A disk cartridge loading/unloading system, mounted to a container which houses a plurality of disk cartridges and has an opening for accepting the disk cartridges, which system loads or unloads a disk cartridge into or from the container, the system comprising:
   a cartridge holder having a first end and being rotatably supported by the container to rotate between a store position for retaining the disk cartridge and an unloading position for unloading the disk cartridge;
   an open/close cover which is rotatably attached to the first end of the cartridge holder and which closes the container opening when the cartridge holder is in the store position; and
   a drawing member having one end pivotally connected to the open/close cover and having a second end provided with a stop for drawing the cartridge, the open/close cover urging the drawing member to shift toward the first end of the cartridge holder when the open/close cover is rotated.

2. A disk cartridge loading/unloading system, mounted to a container which houses a plurality of disk cartridges and has an opening for accepting the disk cartridges, which system loads or unloads a disk cartridge into or from the container, the system comprising:
   a cartridge holder having a first end and being rotatably supported by the container to rotate between a store position for retaining the disk cartridge and an unloading position for unloading the disk cartridge;
   an open/close cover which is rotatably attached to the first end of the cartridge holder and which closes the container opening when the cartridge holder is in the store position;
   a drawing member having one end pivotally connected to the open/close cover and having a second end provided with a stop for drawing the cartridge, the open/close cover urging the drawing member to shift toward the first end of the cartridge holder when the open/close cover is rotated;
   a lock member which is provided in said cartridge holder and which prevents said drawing member from shifting toward the front end of said cartridge holder; and
   a lock release member releasing the lock member from the drawing member when the cartridge holder is rotated by a predetermined angle from the store position of the cartridge holder.

3. A disk cartridge loading/unloading system, mounted to a container which houses a plurality of disk cartridges and has an opening for accepting the disk cartridges, which system loads or unloads a disk cartridge into or from the container, the system comprising:
   a cartridge holder having a first end and being rotatably supported by the container to rotate between a store position for retaining the disk cartridge and an unloading position for unloading the disk cartridge;
   an open/close cover which is rotatably attached to the first end of the cartridge holder and which closes the container opening when the cartridge holder is in the store position;
   a drawing member having one end pivotally connected to the open/close cover, and having a second end provided with a stop for drawing the cartridge, the open/close cover urging the drawing member to shift toward the first end of the cartridge holder when the open/close cover is rotated; and
   stop members which are provided in the cartridge holder and which are engaged with the disk cartridge so as to prevent the disk cartridge from coming out of the disk cartridge holder when the disk cartridge is retained in a predetermined position of the cartridge holder.

4. A disk cartridge loading/unloading system according to claim 3, wherein the stop member includes a plate spring, one end of which spring is secured to the outer surface of the disk cartridge, and an arresting piece which is secured to the other end of the plate spring, and which is slidably attached to the side of the cartridge holder so as to move back and forth, the arresting piece being energized by the plate spring so as to be engaged with a concavity of the disk cartridge retained in the predetermined position of the disk cartridge holder.

* * * * *